United States Patent [19]
Mun et al.

[11] Patent Number: 5,309,154
[45] Date of Patent: May 3, 1994

[54] SELECTIVE CALL RECEIVER WITH A UNIVERSAL SYNCHRONIZATION CODE OPERATING MODE

[75] Inventors: Kyung T. Mun, Mesa, Ariz.; Charles J. Ganucheau, Jr.; Leonard E. Nelson, both of Boynton Beach, Fla.

[73] Assignee: Motorola, Inc., Schaumburg, Ill.

[21] Appl. No.: 880,277

[22] Filed: May 8, 1992

[51] Int. Cl.⁵ .............................................. H04B 7/00
[52] U.S. Cl. ........................... 340/825.44; 340/825.47
[58] Field of Search ...................... 340/825.44, 825.26, 340/825.27, 825.47, 311.1; 455/343, 38.3

[56] References Cited

U.S. PATENT DOCUMENTS

| | | |
|---|---|---|
| 4,506,262 | 3/1985 | Vance et al. |
| 4,783,654 | 11/1988 | Ichikawa. |
| 4,845,491 | 7/1989 | Fascenda et al. |
| 4,860,003 | 8/1989 | DeLuca et al. |
| 5,043,718 | 8/1991 | Shimura. |
| 5,146,216 | 9/1992 | DeLuca et al. ................. 340/311.1 |
| 5,187,471 | 2/1993 | Wagai et al. ..................... 455/343 |
| 5,196,842 | 3/1993 | Gomez et al. ................... 340/311.1 |

Primary Examiner—Donald J. Yusko
Assistant Examiner—John Giust
Attorney, Agent, or Firm—Michael J. DeLuca; Daniel R. Collopy; Thomas G. Berry

[57] ABSTRACT

A selective call receiver (30) for receiving selective call signals in a universal synchronization code operating mode receives signals having the conventional POCSAG sync code and signals having dual sync codes and decodes the signals appropriately to recover personal and information services messages. Whether the receiver (30) is operating in a conventional POCSAG system or a dual sync code system, the receiver (30) conserves battery power by activating the high battery draining receiver circuit (34) only during frames (106) of the signal (100) wherein personal message addresses or database information is likely to appear. The frames (106) where the personal message addresses are likely to appear and where the database information appear are indicated by a frame byte stored in a memory (48) with the corresponding address.

11 Claims, 5 Drawing Sheets

SELECTIVE CALL RECEIVER WITH A UNIVERSAL SYNCHRONIZATION CODE OPERATING MODE

FIELD OF THE INVENTION

This invention relates in general to selective call receivers, and in particular to a method and apparatus for receiving selective call signals having a plurality of synchronization code operating modes.

BACKGROUND OF THE INVENTION

Selective call receivers are radio frequency (RF) receivers which selectively receive messages. Selective call messages are recovered from a selective call transmission by demodulating and decoding a selective call signal broadcast by a selective call network. Selective call signalling networks typically utilizes a binary frequency shift keying (FSK) modulation signalling protocol such as the POCSAG signalling code. POCSAG is a signalling protocol originally proposed by British Telecom and an anagram for the Post Office Code Standardization Advisory Group.

A POCSAG signal comprises a preamble having a number of zero-to-one transitions. The POCSAG protocol receivers perform bit synchronization on the transitions of the preamble. Bit synchronization is a process used to determine the presence of bit boundaries of a data transmission having bits transmitted at a predetermined baud rate, and thereafter to provide a clock to synchronously sample the bits. One method for POCSAG bit synchronization is described in U.S. Pat. No. 4,506,262.

The first word following the preamble in POCSAG signalling is a synchronization (sync) code word which is defined to contain a predetermined binary sequence used for frame synchronization. Frame synchronization frames the bits transmitted so that the data transmitted is in a form to be decoded, thereby indicating various word boundaries such as the first bit of address and data signals. The predetermined binary sequence is the defined POCSAG sync code word. Sixteen words of information, divided into eight frames, follow before the sync code is repeated. The sync code word provides a means for detection of frame synchronization. The combination of a sync code and the eight frames following is referred to as a batch.

If no frame synchronization has been detected within a period of time substantially greater than the time to transmit sixteen words (five minutes, for example), the POCSAG selective call receiver determines that it has lost the signal and begins searching for the preamble in a conventional manner.

If frame synchronization has been detected, the POCSAG selective call receiver looks in the following frames for its address and an associated message. Conventionally, a selective call receiver examines a predetermined one of the eight frames following the sync code to determine whether the receiver has been addressed. When an address assigned to the receiver is detected in the corresponding frame, the selective call receiver decodes a selective call message. The user is alerted that a message has been received and the message can thereafter be presented, either as a voice message or a numeric or alphanumeric displayed message.

More recently, users of selective call receivers desire additional features, such as reception of information services, while maintaining the desire for small portable receivers. Information services are services which provide regularly updated messages, such as news services (UPI), financial services (Dow Jones Stock Reports), or sports services. One such information services selective call system is described in U.S. Pat. No. 4,845,491.

A selective call receiver must necessarily process information service selective call messages different than personal selective call messages. Additionally, the information service messages may be longer than (and could possibly be substantially longer than) one frame of the POCSAG protocol. One method proposed for differentiating the two types of messages utilizes dual synchronization codes—one indicating personal messages follow, and the other indicating that information services messages follow. U.S. Pat. No. 4,783,654 describes an example of a dual sync code system. Some selective call systems have adopted a dual sync code protocol. Other selective call systems use the defined POCSAG sync code.

It is undesirable for a user to use two selective call receivers to be able to receive messages in dual sync code systems and conventional POCSAG sync code systems. Yet, conventional selective call receivers may only receive and decode signals of one type or the other.

Thus, what is needed is a method and apparatus for receiving selective call signals in a universal synchronization code operating mode wherein conventional POCSAG signals and signals utilizing dual synchronization codes can be received and decoded appropriately to recover personal and information services messages.

SUMMARY OF THE INVENTION

In carrying out the objects of the present invention in one form, there is provided a selective call receiver for receiving a signal comprising batches, each batch comprising a plurality of frames. The selective call receiver comprises receiver circuitry for receiving the signal and a memory means for storing a plurality of addresses assigned to the selective call receiver and for storing a plurality of frame bytes, each of the plurality of frame bytes corresponding to one of the plurality of addresses. A synchronization code detection means is coupled to the receiver circuitry for detecting one of a number of predetermined synchronization codes. A control means is coupled to the memory means and the synchronization code detection means for combining ones of the plurality of frame bytes in a predetermined manner to form a frame process byte comprising a plurality of bits, each of the plurality of bits corresponding to one of the plurality of frames and having a binary value, the ones of the plurality of frame bytes determined in response to the one of a number of predetermined synchronization codes. A power conservation means of the selective call receiver is coupled to the control means for activating or deactivating the receiver circuitry during reception of one of the plurality of frames in response to the binary value of the one of the plurality of bits corresponding to the one of the plurality of frames.

DETAILED DESCRIPTION OF THE INVENTION

Figure 1:
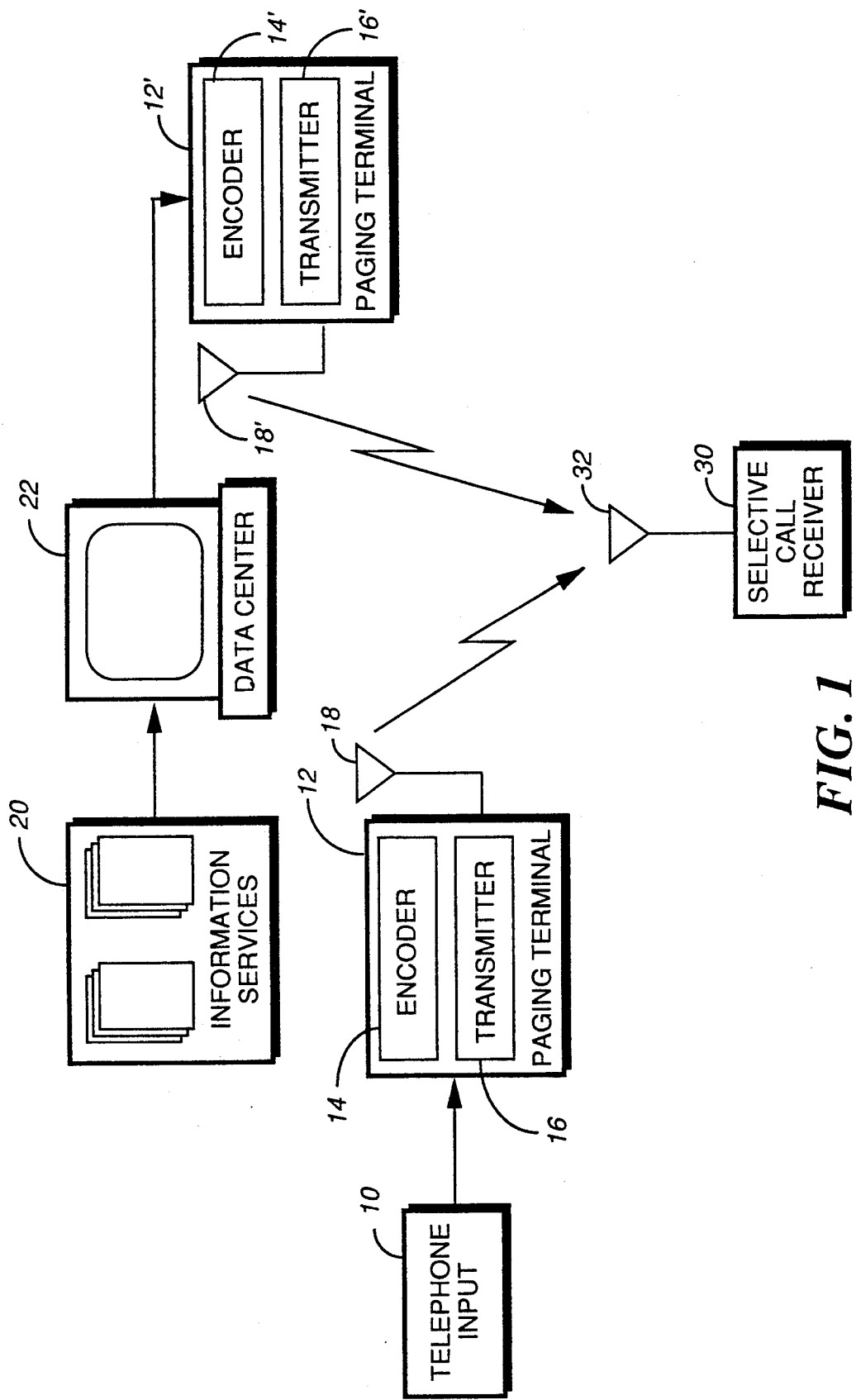
FIG. 1 is a block diagram of a selective call system in accordance with a preferred embodiment of the present invention.

Referring to FIG. 1, a selective call system in accordance with a preferred embodiment of the present invention transmits two types of signals: information services signals and personal message signals. As is well known to those skilled in the art, an originator of a personal selective call message inputs message information via a telephone input 10 to a paging terminal 12. The paging terminals comprises an encoding 14 for encoding the message information into selective call signals and a transmitter 16 for transmitting the selective call signals via an antenna 18.

Information services signals are derived from information services 20 which compile financial, sports, news, etc. information and forward the information to a data center 22. The data center 22 compiles the information provided by the information services 20 into appropriate messages which are provided through a paging terminal 12' for transmission as selective call signals therefrom. The paging terminal 12' similarly comprises an encoder 14', a transmitter 16', and an antenna 18'.

Thus, it can be seen that a selective call system in accordance with a preferred embodiment of the present invention broadcast signals comprising personal message selective call messages and information services selective call messages for a reception by a receiver 30 via an antenna 32.

Figure 2:
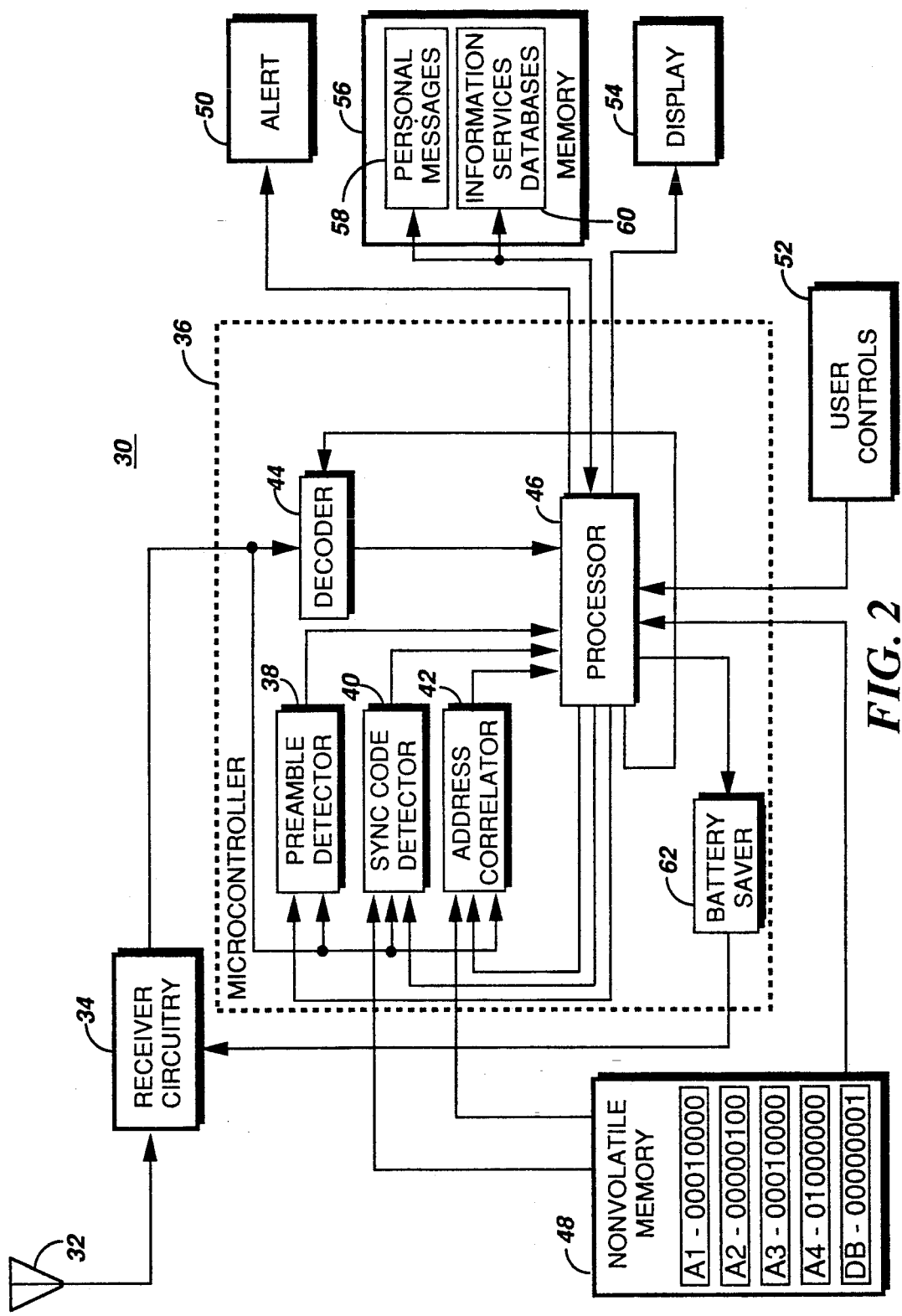
FIG. 2 is a block diagram of the selective call receiver of FIG. 1 in accordance with the present invention.

Referring to FIG. 2, the receiver 30 receives the selective call signals at the antenna 32 which generates electrical signals in response to the radio frequency information received and forwards the signals to receiver circuitry 34 for demodulation. The demodulated signal is provided to a microcontroller 36 for processing thereby. The demodulated signal is provided to a preamble detector 38, a sync code detector 40, an address correlator 42, and a decoder 44.

The preamble detector 38 attempts to detect the predetermined number of zero-to-one transitions indicating a POCSAG preamble. Upon detection of the preamble, the preamble detector 38 provides a signal to a processor 46. The processor 46 oversees the reception of the signal and, for that purpose, provides signals to the preamble detector 38, the sync detector 40, the address correlator 42, and the decoder 44 to turn the various blocks off and on at appropriate times.

In response to the signal from the preamble detector 38, the processor 46 activates the sync code detector 40 to examine the demodulated signal in order to detect the occurrence of a synchronization code. The sync code detector 40 provides a signal to the processor 46 in response to detection of the sync code.

In accordance with the preferred embodiment of the present invention, the sync code detector 40 can detect and distinguish the dual sync codes when operating in a dual sync operating mode and can operate in a universal synchronization code operating mode wherein the sync code detector recognizes the dual sync codes and the conventional POCSAG sync code. In the universal sync code operating mode, a selective call receiver in accordance with the present invention can process conventional POCSAG signals and dual sync code signals to recover the same database and personal message information as if the receiver were dedicated to receive only one mode.

Specifically, in accordance with the preferred embodiment of the present invention, a dual sync code system transmits the sync codes to enable the receiver to determine whether to receive the following information as personal message signals in POCSAG format or information services message signals. In a conventional POCSAG system, a frame may be dedicated for information services signals such that all information service receivers will know to look in the dedicated frame for a code (such as an address code) to determine whether to receive the signals as information services signals or personal message signals. The dedicated frame of the preferred embodiment of the present invention is the first frame as indicated by a database frame code (DB) stored in a nonvolatile memory 48, wherein the least significant bit (rightmost) indicates the first frame.

When operating in a universal sync code operating mode in accordance with the present invention, signals will be received in the same manner regardless of whether the signals are broadcast as dual sync code signals or conventional POCSAG signals and the receiver will be able to advantageously determine whether to receive the signals as information service signals or as personal message signals as if the receiver were operating in the appropriate operating mode.

The selective call receiver 30 therefore can operate in a dual sync code operating mode or a universal sync code operating mode. The sync code detector is coupled to the nonvolatile memory 48 for retrieving information necessary to determine the mode of operation. In the dual sync mode, the coupling between the memory 48 and the sync code detector 40 is also utilized to differentiate between the two sync codes.

After receiving the signal from the sync code detector 40 of successful sync code detect, the processor 46 provides start and stop signals to the address correlator 42 to attempt to correlate the demodulated signal information in the POCSAG frames with a predetermined address assigned to the receiver. The addresses assigned to the receiver are stored in the nonvolatile memory 48. The address correlator 48 will provide a signal to the processor 46 upon determination of address correlation or address noncorrelation.

In accordance with the present invention, each address stored in the memory 48 has a frame byte associated therewith. The frame bytes comprise eight bits representing the eight frames of a POCSAG batch. Each frame byte indicates which one of the eight frames are assigned to the address by setting the appropriate bit to a value of binary one. The leftmost bit is the most significant bit and thus represents frame eight. Likewise, the rightmost bit (the least significant bit) represents frame one. In addition, the database frame byte, as described above, indicates which frame of a conventional POCSAG signal comprises signals indicating an information services transmission.

When the address correlator 42 detects an address of the receiver in the appropriate frame, the decoder 44 is signalled by the processor 46 to decode the demodulated signal and provides the decoded signal to the processor 46.

The processor 46 additionally performs the conventional functions of the selective call receiver such as activating an alert 50 upon reception of a selective call message, receiving user inputs via user controls 52 and acting thereon, providing information such as selective call messages to a display 54 for viewing by the user, and providing selective call message information to and accessing selective call message information from a memory 56, such as a random access memory (RAM), for storage therein or recalling stored information from the memory 56.

The preferred embodiment of the present invention is a multi-function selective call receiver which can receive both personal messages and information service messages. The personal messages are stored in a portion 58 of the memory 56 while information service messages establish or modify databases within a portion 60 of the memory 56.

A battery saver 62 provides a signal to the receiver circuitry 34 to turn the receiver circuitry 34 ON or OFF to conserve power. The receiver circuit 62 is a high power consuming circuit and, in order to conserve limited battery power, the processor 46 provides an energization signal to the battery saver 34 to turn the receiver circuit ON and OFF. Typically, the processor 46 would generate a signal to the battery saver to turn ON the receiver after an appropriate OFF time in order for the preamble detector 38 to begin searching for a preamble.

In accordance with the present invention, the processor 46 signals the battery saver 62 to turn the receiver circuitry 34 ON or OFF to allow the address correlator 42 to attempt address correlation in the appropriate frames of a POCSAG batch. In order to efficiently conserve battery power, the processor combines the frame bytes associated with the addresses stored in the nonvolatile memory 48 in a predetermined manner to determine, depending upon the sync mode of operation, during which frames to turn the receiver circuit 34 ON to allow for address correlation by the address correlator 42.

Figure 3:
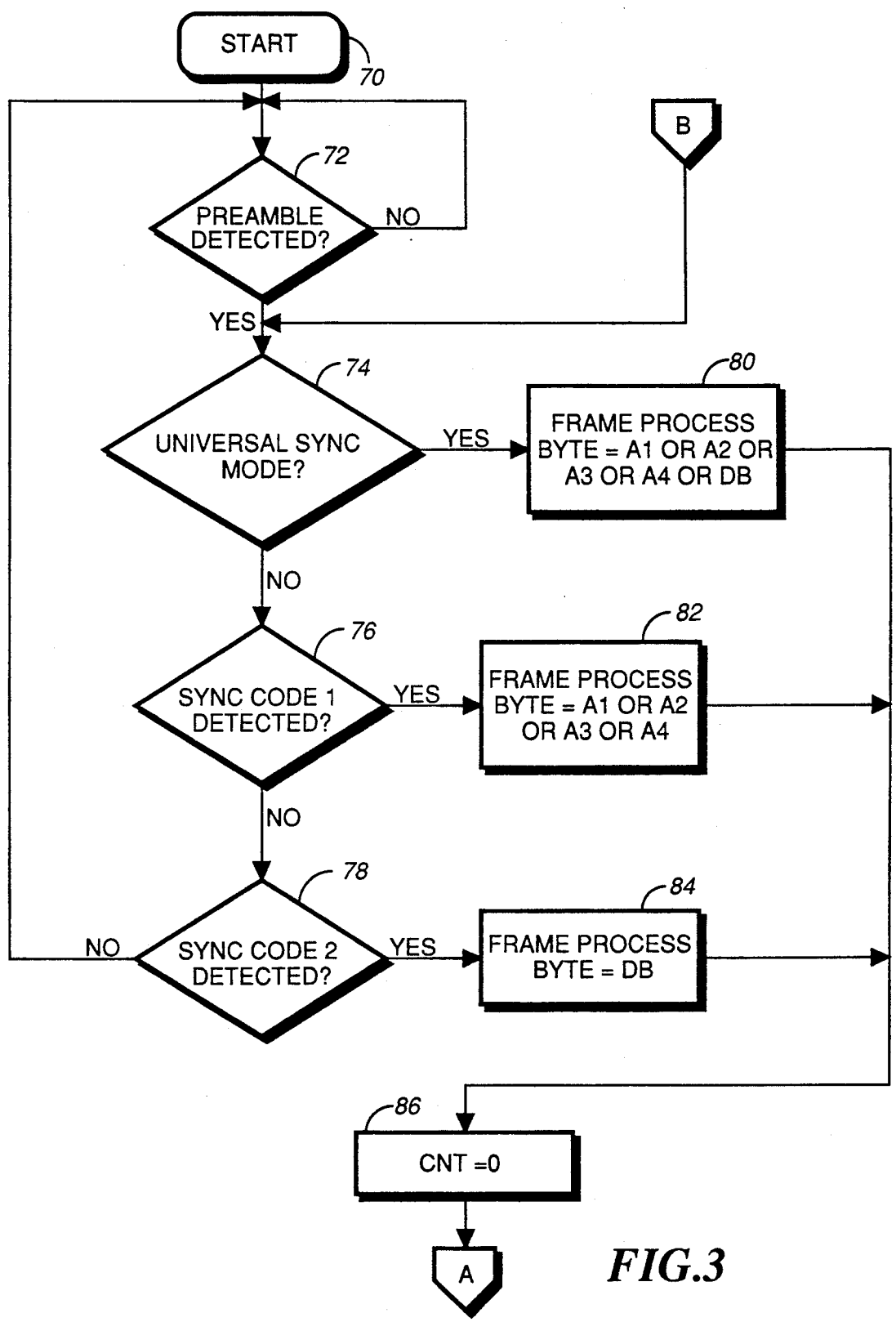
FIGS. 3 and 4 are a flowchart of the operation of the processor shown in FIG. 2 in accordance with the preferred embodiment of the present invention.
Figure 4:
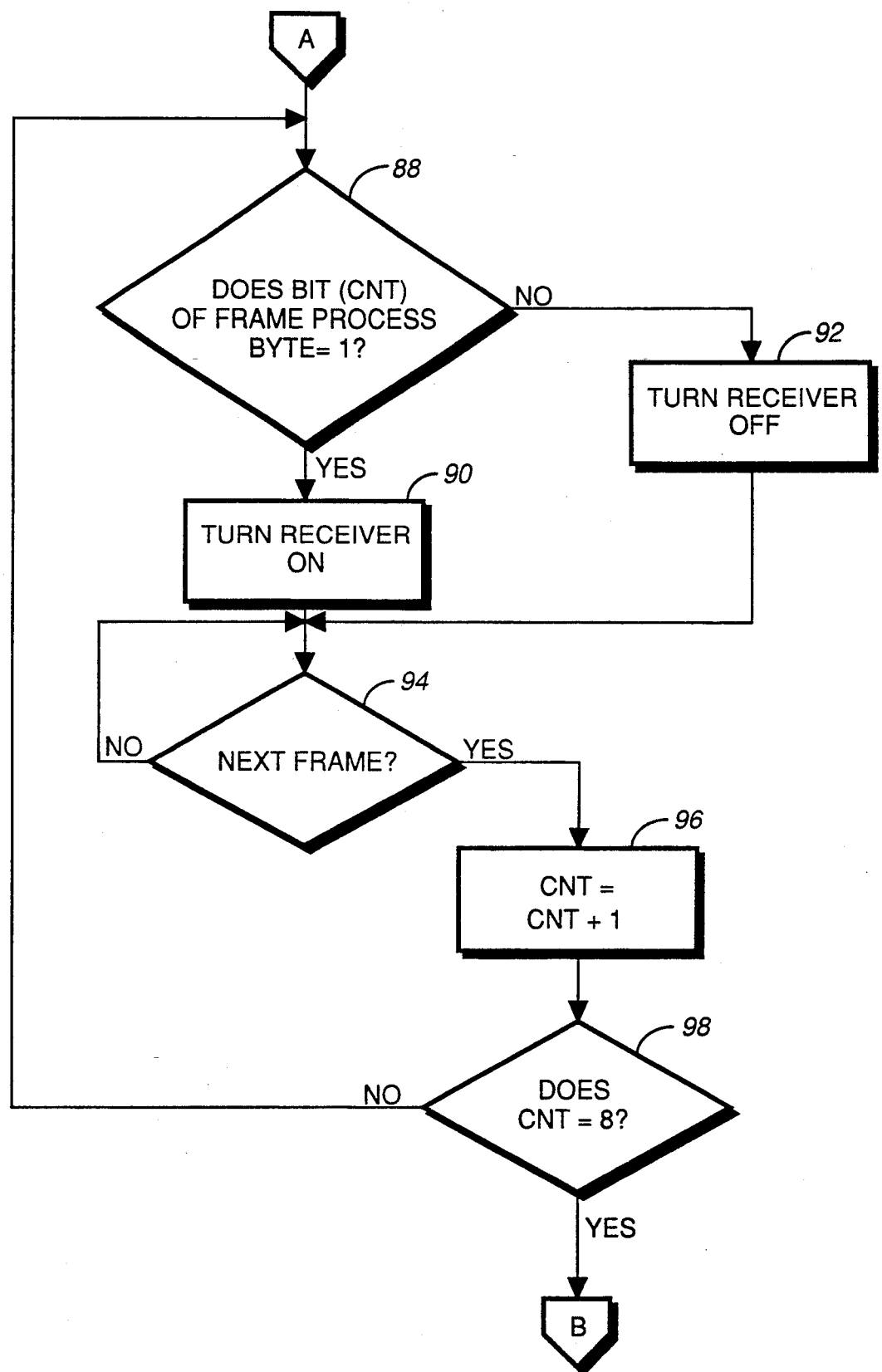

Referring to FIGS. 3 and 4, the operation of the processor 46 to control the battery saver 62 during address correlation in POCSAG frames starts 70 by awaiting a preamble detection 72. This occurs when the selective call receiver is initially energized or when the signal is lost and attempted to be regained.

When the preamble is detected 72, processing determines whether the receiver 30 (FIG. 2) is operating in the universal mode 74. If the receiver 30 is not operating in the universal sync mode 42, then it is operating in the dual sync mode. In the dual sync mode, processing determines whether a first synchronization code indicating personal messages is detected 76 or a second synchronization code indicating database messages is detected 78. If the processor 46 (FIG. 2) is operating in the universal sync mode 74, the bits of each of the frame bytes for the personal messaging addresses A1, A2, A3, and A4 and the bits of the frame byte for the database frame DB stored in the memory 48 (FIG, 2) are combined with the OR function to generate a frame process byte 80. The frame process byte will comprise eight bits and the location of a bit having a value of one indicates a frame in which a personal message or database message for the receiver could occur.

If the processor 46 (FIG. 2) is operating in the dual sync mode and the first sync code indicating personal messages is detected 76, the bits of each of the frame bytes for the personal messaging addresses A1, A2, A3, and A4 are combined in accordance with the OR function to generate a frame process byte 82. The frame process byte for sync code one will comprise eight bits and the location of a bit having a value of one indicates a frame in which a personal message for the receiver could occur. Finally, for database messages in the dual sync mode, as indicated by the second synchronization code 78, the frame process byte is set equal to the database byte DB 84. The database byte typically indicates that database messages will be found in frame one. Since database messages tend to be long, the whole batch or longer could be devoted to the data base message. Therefore, reserving the first frame for database addresses assigned to the receiver is beneficial for conserving system air time.

Once the frame process byte has been calculated 80, 82, 84, a counter CNT for stepping through the eight bits of the frame process byte is initialized to zero 86. If the bit indicated by CNT, BIT(CNT), of the frame process byte has a value of binary one 88, the battery saver 62 is signalled to turn the receiver circuit 34 ON 90. On the other hand, if the bit indicated by CNT has a value of binary zero 88, the battery saver 62 is signalled to turn the receiver circuit 34 OFF 92.

After the battery saver 62 is signalled, processing waits for reception of the next frame 94. Therefore, if the receiver is turned ON 90, it will be on for the remainder of the frame. Adjustments to the battery saver in accordance with the present invention are only made once per frame. When the next frame is received 94, the counter CNT is incremented by one 96 to align the bits of the frame process byte with the frame being received. If CNT is not eight 98, processing returns to examine the value of the frame process byte 88 corresponding to the received frame.

Once CNT is incremented 96 to have a value of eight 98, all of the bits of the frame process byte have been read and, consequently all the frames of a batch have been received. Thus, processing returns to sync detect 74, 76, 78.

It can be seen by one skilled in the art that power conservation in accordance with the present invention, quickly and efficiently limits energization of the receiver circuit 34 to frames in which addresses of the receiver are assigned. Whether operating in universal or dual sync mode, the objective in a selective call receiver is to conserve battery power in order to improve battery life.

Figure 5:
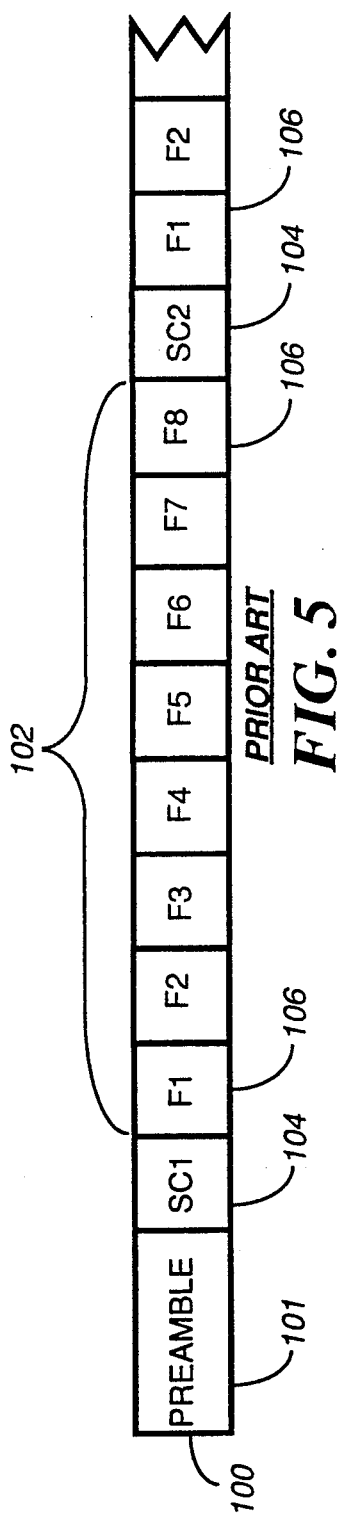
FIG. 5 is a diagram of a signal encoded in accordance with the POCSAG signalling protocol.
Figure 6:
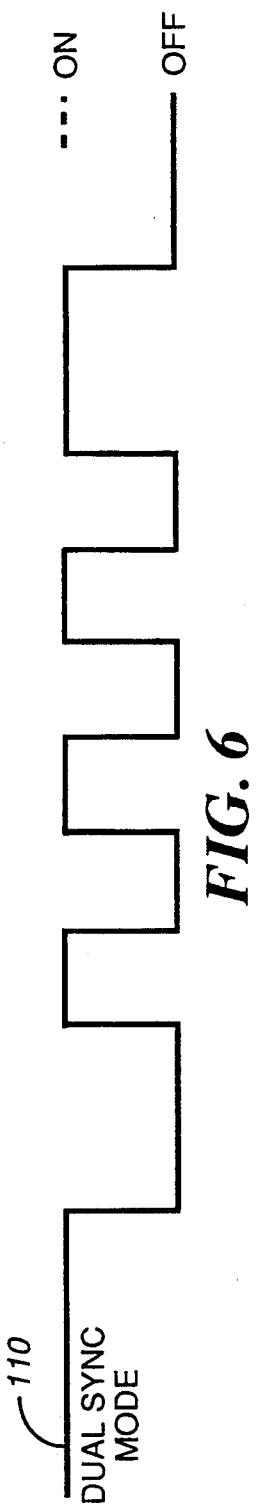
FIG. 6 is a power conservation signal diagram during dual sync mode operation in accordance with the present invention.
Figure 7:
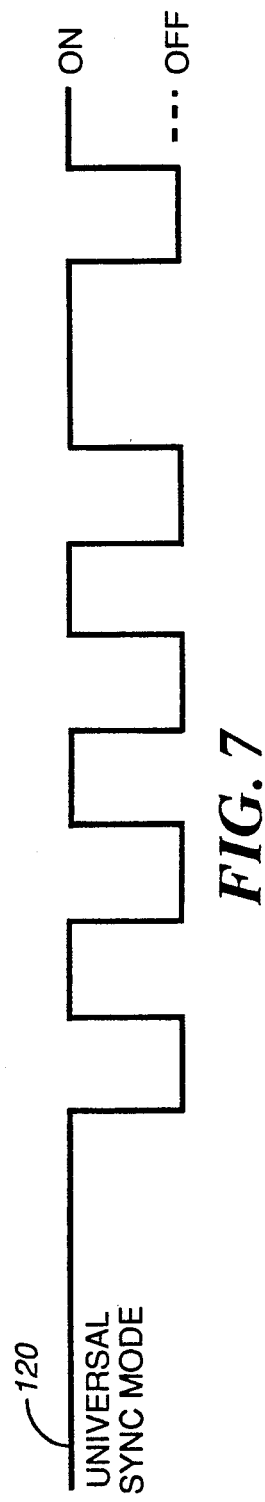
FIG. 7 is a power conservation signal diagram during universal sync mode operation in accordance with the present invention.

Referring to FIGS. 5, 6, and 7, a signal diagram of two of the battery saving signals produced in accordance with the present invention depict clearly the difference in various modes of operation. FIG. 5 is a diagram of a conventional POCSAG signal 100 comprising a preamble 101, and a variety of batches 102. Each batch comprises a sync code word 104 and eight two-word frames 106.

Referring to FIG. 6, a battery saving signal 110 is exemplary of signaling in accordance with the present invention. In the first batch 102 (FIG. 5), wherein the receiver is turned OFF after detection of the sync code and turned ON for frames three, five, and seven, the personal message synchronization code (SC1) causes the frame process byte to comprise a combination of only personal addresses. In the second batch, the second sync code (SC2) indicating database messages turns on the receiver only for the frame assigned thereto, after which the receiver circuit 34 is turned OFF.

Referring to FIG. 7, the signalling diagram of battery saving in the universal sync mode 120 turns the receiver ON for every frame which could contain a database or a personal message. Thus it can be seen that the advantages of the present invention wherein the receiver 30 discriminates between information services signals and personal message signals regardless of whether the signals are transmitted in conventional POCSAG with the defined POCSAG sync code or transmitted in a dual sync code signalling scheme does not unduly impact battery saving. A receiver 30 operating in accordance with the present invention can conserve power during frames where information inessential to the receiver 30 is not present.

By now it should be appreciated that there has been provided a method and apparatus for operating in a universal sync code mode to receive selective call signals having the conventional POCSAG synchronization code and a dual synchronization code and decoding the signals appropriately to recover personal and information services messages. The selective call receiver 30 in accordance with the preferred embodiment of the present invention comprises stored frame bytes which, when combined with the knowledge of whether the receiver 30 is operating in a universal sync code system or a dual sync code system, allows the receiver to conserve battery power by activating the high battery draining receiver circuit only during frames of the POCSAG signal wherein addresses are likely to appear. The frames where the addresses are likely to appear and where the database addresses appear are indicated by a frame byte stored with the corresponding address.

What is claimed is:

1. A method for power conservation in a selective call receiver having a plurality of addresses assigned thereto, each of the plurality of addresses having one of a plurality of frame bytes associated therewith, the selective call receiver having receiver circuitry for receiving a signal comprising at least one batch, each of the at least one batch comprising a plurality of frames, each of the plurality of frames comprising one of a number of predetermined synchronization codes, the method comprising the steps of:
   (a) receiving the signal;
   (b) detecting the one of a number of predetermined synchronization codes;
   (c) combining ones of the plurality of frame bytes in a predetermined manner to form a frame process byte comprising a plurality of bits, each of the plurality of bits corresponding to one of the plurality of frames and having a value of one or zero, the ones of the plurality of frame bytes determined in response to the one of a number of predetermined synchronization codes; and
   (d) conserving power by activating or deactivating the receiver circuitry during reception of one of the plurality of frames in response to the value of the one of the plurality of bits.

2. The method according to claim 1 further comprising the step of (e) deactivating the receiver circuitry during reception of one of the plurality of frames if the one of the plurality of frames corresponds to one of the plurality of bits having a value of zero.

3. The method according to claim 1 further comprising the step of (f) activating the receiver circuitry during reception of one of the plurality of frames if the one of the plurality of frames corresponds to one of the plurality of bits having a value of zero.

4. The method according to claim 1 wherein the step (d) comprises the step of (g) combining ones of the plurality of frame bytes by performing an OR operation on the ones of the plurality of frame bytes to form the frame process byte, the ones of the plurality of frame bytes determined in response to the one of a number of predetermined synchronization codes.

5. A selective call receiver for receiving a signal comprising batches, each batch comprising a plurality of frames, each frame comprising one of a number of synchronization codes, the selective call receiver comprising:
   receiver circuitry for receiving the signal;
   memory means for storing a plurality of addresses assigned to the selective call receiver and for storing a plurality of frame bytes, each of the plurality of frame bytes being predetermined and corresponding to one of the plurality of addresses;
   synchronization code detection means coupled to the receiver circuitry for detecting the one of a number of predetermined synchronization codes; and
   control means coupled to the memory means and the synchronization code detection means for combining ones of the plurality of frame bytes in a predetermined manner to form a frame process byte comprising a plurality of bits, each of the plurality of bits corresponding to one of the plurality of frames and having a binary value, the ones of the plurality of frame bytes determined in response to the one of a number of predetermined synchronization codes; and
   power conservation means coupled to the control means for activating or deactivating the receiver circuitry during reception of one of the plurality of frames in response to the binary value of the one of the plurality of bits.

6. The selective call receiver according to claim 5 wherein the number of predetermined synchronization codes is two.

7. The selective call receiver according to claim 5 wherein the number of predetermined synchronization codes is one.

8. The selective call receiver according to claim 5 wherein the number of predetermined synchronization codes is selectable.

9. In a communication system communicating a signal having a plurality of batches, each of the plurality of batches having either a first or second synchronization code signal, each of the plurality of batches further having at least a first frame and a second frame, wherein the communication system transmits
   a first batch of the plurality of batches having the first synchronization code signal and the first frame of the first batch having a first message signal beginning therein and
   a second batch of the plurality of batches having the second synchronization code signal and the second frame of the second batch having a second message signal beginning therein, a method for receiving the signal comprising the steps of:
   (a) receiving either the first predetermined synchronization code or the second predetermined synchronization code in both the first and second batches;

(b) receiving the first frames in both the first and second batches in response to said step (a) of receiving; and (c) receiving the second frames in both the first and second batches in response to said step (a) of receiving.

11. The method according to claim 9 wherein the first message begins with a first address and the second message begins with a second address different from the first address, wherein said step (b) of receiving further comprises the step decoding for the first address during the first frames, and said step (c) of receiving further comprises the step of decoding for the second address during the second frames, thereby decoding for the first message signal during the first batch and the second message signal during the second batch.

11. In a communication system communicating a signal having a plurality of batches, each of the plurality of batches having either a first or second synchronization code signal, each of the plurality of batches further having at least a first frame and a second frame, wherein the communication system transmits a first batch of the plurality of batches having the first synchronization code signal and the first frame of the first batch having a first message signal beginning therein and a second batch of the plurality of batches having the second synchronization code signal and the second frame of the second batch having a second message signal beginning therein, a selective call receiver for processing the signal comprising:

a receiver for receiving the signal;

a synchronization code detector for detecting either the first predetermined synchronization code or the second predetermined synchronization code during both the first and second batches; and a message decoder responsive to said synchronization code detector for decoding in both the first and second frames of both the first and second batches in response to said synchronization code detector detecting either the first predetermined synchronization code or the second predetermined synchronization code.

* * * * *